Sept. 25, 1956  F. LEBER  2,764,032
CHANGE GEAR TRANSMISSION
Filed Dec. 6, 1954
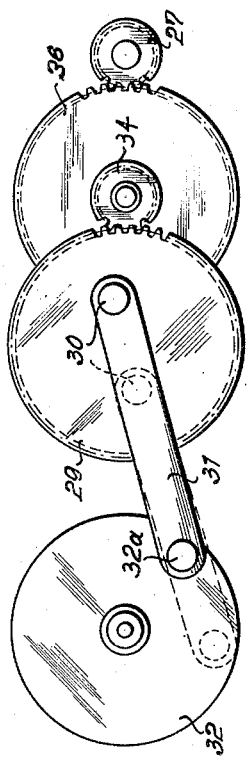
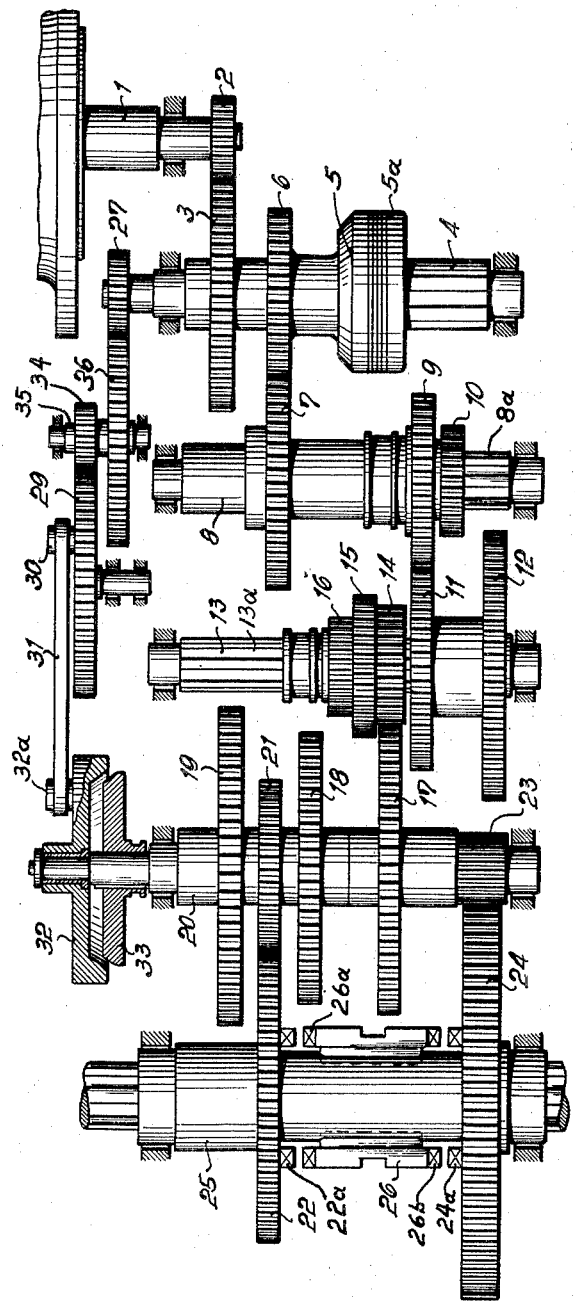
INVENTOR:
Felix Leber
By [signature]
Patent Agent

United States Patent Office 2,764,032
Patented Sept. 25, 1956

2,764,032

CHANGE GEAR TRANSMISSION

Felix Leber, Koln-Riehl, Germany

Application December 6, 1954, Serial No. 473,353

5 Claims. (Cl. 74—339)

The present invention relates to change gear transmissions. With such transmissions the shifting from one velocity range to another velocity range is sometimes impeded when the teeth of one gear are aligned with the teeth of the other gear with which the first mentioned gear has to be brought into mesh.

It is, therefore, an object of the present invention to provide an arrangement which will overcome the above mentioned drawback.

It is another object of this invention to provide a change gear transmission which, whenever it is desired to bring the teeth of one gear into mesh with the tooth spaces of the other gear, will assure an alignment of the teeth of one gear with the tooth spaces of the other gear.

It is still another object of this invention to provide an arrangement as set forth in the preceding paragraphs which is simple in construction, easy to operate and relatively inexpensive.

These and other objects and advantages of the invention will appear more clearly from the following specification in connection with the accompanying drawing in which:

Fig. 1 is a top view, partly in section of a change gear transmission provided with an arrangement according to the present invention.

Fig. 2 diagrammatically illustrates a side view of the mechanism according to the present invention.

General arrangement

The primary feature of the present invention consists in that the gear transmission is provided with an oscillating device which is arranged, during the shifting of the gears for bringing one gear into mesh with another gear, to impart an oscillating movement upon one of the gears to be brought into meshing engagement with each other. This oscillating movement is effected at a very low speed which may be termed "a crawling speed" so that once the two gears to be engaged with each other have such a relative position with regard to each other that some teeth of one gear are in alignment with the adjacent tooth spaces of the other gear, the shiftable gear can easily be brought into engagement with the other gear without any material friction.

When a transmission with a plurality of intermediate transmission shafts is involved, preferably a countershaft having the cluster gears fixedly connected thereto is oscillated during the shifting operation by a drive motor through the intervention of a crank drive. This oscillating movement is carried out at a very low speed so that the two gears to be engaged with each other will be slowly oscillated relative to each other prior to the actual shifting movement. As soon as the teeth of one gear mesh with the tooth spaces of the other gear and have been brought into meshing engagement with each other, the oscillating movement which has been imparted upon the countershaft through the intervention of a slip clutch is interrupted and, preferably through another clutch, the driving engagement from the input shaft to the output shaft of the transmission is established.

Structural arrangement

Referring now to the drawing in detail, the drive or input shaft 1 has fixedly connected thereto a pinion 2 which continuously meshes with a pinion 3 fixedly connected to an intermediate shaft 4. The intermediate shaft 4 has freely rotatably mounted thereon a gear 6 which is connected with a clutch member 5 adapted to engage a clutch member 5a which is slidably mounted on shaft 4 so as to selectively disengage or engage the clutch member 5, but is rotatably connected thereto.

The gear 6 is in continuous mesh with a gear 7 which is fixedly connected to a shaft 8. The shaft 8 has by means of a splined portion 8a rotatably connected thereto the sliding gears 9 and 10 which are, however, shiftable in axial direction of the shaft 8. These gears are shiftable in such a manner that selectively the gear 9 can be brought into meshing engagement with a gear 11, or the gear 10 can be brought into meshing engagement with a gear 12. The gears 11 and 12 are fixedly connected to an intermediate shaft 13. In the particular position shown in the drawing, the gear 9 meshes with the gear 11.

The shaft 13 is also provided with a splined section 13a by means of which the gears 14, 15 and 16 are rotatably connected to the shaft 13 while being shiftable thereon in axial direction of said shaft 13. The gears 14, 15 and 16 may selectively and respectively be brought into meshing engagement with the gears 17, 18 and 19 which are fixedly connected to the counter shaft 20. In the particular position shown in the drawing, the gear 14 meshes with the gear 17. The countershaft 20 is adapted through the intervention of a gear 21 likewise fixedly connected to the shaft 20 to drive the gear 22 which is in permanent meshing engagement with the gear 21. The countershaft 20 has furthermore fixedly connected thereto a gear 23 which is in permanent meshing engagement with a gear 24 freely rotatable on shaft 25. The gear 22 is freely rotatably mounted on a shaft 25. The shaft 25 has rotatably connected thereto a jaw clutch 26 which is slidable in axial direction on the shaft 25. The jaws 26a of the jaw clutch 26 are adapted selectively to be brought into meshing engagement with the jaws 22a of the gear 22. The gear 24 which, as previously mentioned is freely rotatably mounted on shaft 25, is provided with jaws 24a adapted to mesh with the jaws 26b of the jaw clutch 26 when the latter is shifted toward the gear 24. In the particular position shown in Fig. 1, the clutch 26 occupies its intermediate or ineffective position so that neither one of the gears 22 and 24 is drivingly connected with the shaft 25.

The shaft 20 has furthermore rotatably connected thereto a clutch member 33 which is slidable in axial direction on shaft 20 and may selectively be brought into engagement with a clutch member 32 which is freely rotatable about the shaft 20. The clutch member 32 has eccentrically connected thereto a pivot 32a having pivotally connected thereto a connecting rod 31. The connecting rod 31 in its turn is pivotally connected by means of a pivot 30 with a gear 29 which in its turn meshes with a pinion 34. The pinion 34 is fixedly connected with a shaft 35 which has also fixedly connected thereto a gear 36. The gear 36 is in permanent meshing engagement with the pinion 27 fixedly connected to the shaft 4.

Operation

When a gear shifting operation is to be effected, first the jaw clutch 26 is moved into its neutral or ineffective position shown in Fig. 1, whereupon the clutch members 5 and 5a are disengaged and the clutch member 33 is moved into engagement with the clutch member 32. Consequently, the countershaft 20 now carries out an oscillating movement imparted thereupon by the following gear train: 1, 2, 3, 27, 36, 35, 29, connecting rod 31, clutch member 32 and clutch member 33. If it is desired to bring the gear 15 into meshing engagement with the gear 18, and, to this end, the sliding gears 14, 15, 16 are moved on shaft 13 in axial direction thereof, the gears 14 and 17 disengage each other, while the gear 18 carries out an oscillating movement laterally of the gear 15. Inasmuch as this oscillating movement is carried out at an extremely low speed, no difficulty exists in bringing the gear 15 into mesh with gear 18 as soon as some tooth spaces of the latter are in alignment with adjacent teeth of the gear 15.

After this shifting operation has been completed, either the jaws 26a and 22a or the jaws 26b and 24a may be brought into mesh with each other depending on whether gear 22 or gear 24 is to be drivingly connected with shaft 25. It should be noted that this shifting operation is likewise facilitated by the arrangement according to the invention since at this time shaft 20 is still oscillated and, therefore, gears 21 and 23 oscillate the gears 22 and 24. If shaft 25 should be under load when one of the gears 22, 24 is being drivingly connected therewith by clutch member 26, the clutch members 32, 33 will merely slip relative to each other. As soon as driving connection has been established between shaft 25 and either gear 22 or 24, the clutch elements 32 and 33 are again disengaged from each other, and the clutch members 5 and 5a are brought into engagement with each other. The driving connection between the input shaft 1 and the output shaft 25 is then re-established.

It is, of course, understood that instead of shifting the cluster gears 14, 15, 16, also the cluster gears 9, 10 may be shifted on shaft 8 with the benefit of the present invention if care is taken that the shaft 13 through the intervention of one of the cluster gears 14, 15, 16 carries out the oscillating movement conveyed to shaft 13 by shaft 20.

Furthermore, the clutch 32, 33 may also be replaced by another friction clutch such as a multiple die clutch. It is merely necessary that the clutch parts of such clutch can slide or slip relative to each other in case of an overload to protect the gears or the oscillating system from breaking when the output shaft is under load at the time driving connection is established between the oscillating system and the output shaft, or between the input shaft and the output shaft through the transmission gears while the clutch members 32 and 33 still engage each other.

It is also to be understood that the present invention is, by no means, limited to the particular construction shown in the drawings but also comprises any modifications within the scope of the appended claims.

What I claim is:

1. In combination in a change gear transmission having an input shaft and an output shaft: a first gear arranged for driving connection with said input shaft, a second gear arranged for driving connection with said output shaft, the axes of rotation of said gears being substantially parallel to each other, at least one of said gears being shiftable selectively parallel to the axis of rotation of the other gear into or out of meshing engagement with said other gear, and oscillating means arranged for selective driving connection with one of said first and second gears for slowly oscillating said last mentioned one gear relative to the other one of said first and second gears to facilitate placing said gears into meshing engagement with each other.

2. In combination in a change gear transmission having an input shaft and an output shaft: a first gear arranged for driving connection with said input shaft, a second gear arranged for driving connection with said output shaft, the axes of rotation of said gears being substantially parallel to each other, at least one of said gears being shiftable selectively parallel to the axis of rotation of the other gear into or out of meshing engagement with said other gear, and crank drive means arranged to be driven by one of said shafts and operable selectively to effect a slow relative oscillating movement between said gears to facilitate bringing about meshing engagement of said gears with each other.

3. In combination in a change gear transmission having an input and an output shaft: a first intermediate rotatable shaft drivingly connected to said input shaft, a second intermediate rotatable shaft substantially parallel to said first intermediate shaft and drivingly connected to said output shaft, each of said intermediate shafts having at least two gears mounted thereon for rotation therewith, the gears of one of said shafts being shiftable in axial direction of said one shaft relative to the gears of the other intermediate shaft for selectively establishing driving connection between one gear of said first intermediate shaft and a second gear of said second intermediate shaft, oscillating means drivingly connected with said input shaft and also drivingly connected with one of said intermediate shafts for oscillating said one shaft, and clutch means arranged for selectively establishing driving connection between said oscillating means and one of said intermediate shafts.

4. In combination in a change gear transmission having an input shaft and an output shaft: a first gear arranged for driving connection with said input shaft, a second gear arranged for driving connection with said output shaft, the axes of rotation of said gears being substantially parallel to each other, at least one of said gears being shiftable selectively parallel to the axis of rotation of the other gear into or out of meshing engagement with said other gear, oscillating means arranged for selective driving connection with one of said first and second gears for slowly oscillating said last mentioned one gear relative to the other one of said first and second gears to facilitate placing said gears into meshing engagement with each other, and step-down transmission means interposed between said input shaft and said oscillating means.

5. In combination in a change gear transmission having an input shaft and an output shaft: a first gear arranged for driving connection with said input shaft, a second gear arranged for driving connection with said output shaft, the axes of rotation of said gears being substantially parallel to each other, at least one of said gears being shiftable selectively parallel to the axis of rotation of the other gear into or out of meshing engagement with said other gear, oscillating means arranged selectively to effect a slow relative oscillating movement between said gears to facilitate placing said gears into meshing engagement with each other, and clutch means interposed between said oscillating means and one of the gears to be brought into meshing engagement with each other and operable selectively to effect or interrupt driving connection between said oscillating means and said one gear.

References Cited in the file of this patent
UNITED STATES PATENTS

| | | |
|---|---|---|
| 2,369,528 | Buck | Feb. 18, 1945 |
| 2,433,003 | Swennes | Dec. 23, 1947 |
| 2,453,794 | Iavelli | Nov. 16, 1948 |
| 2,699,072 | Wrinkle | Jan. 11, 1955 |